Jan. 1, 1929.
W. H. LUCAN
CREAM AERATOR
Filed June 9, 1927   2 Sheets-Sheet 1
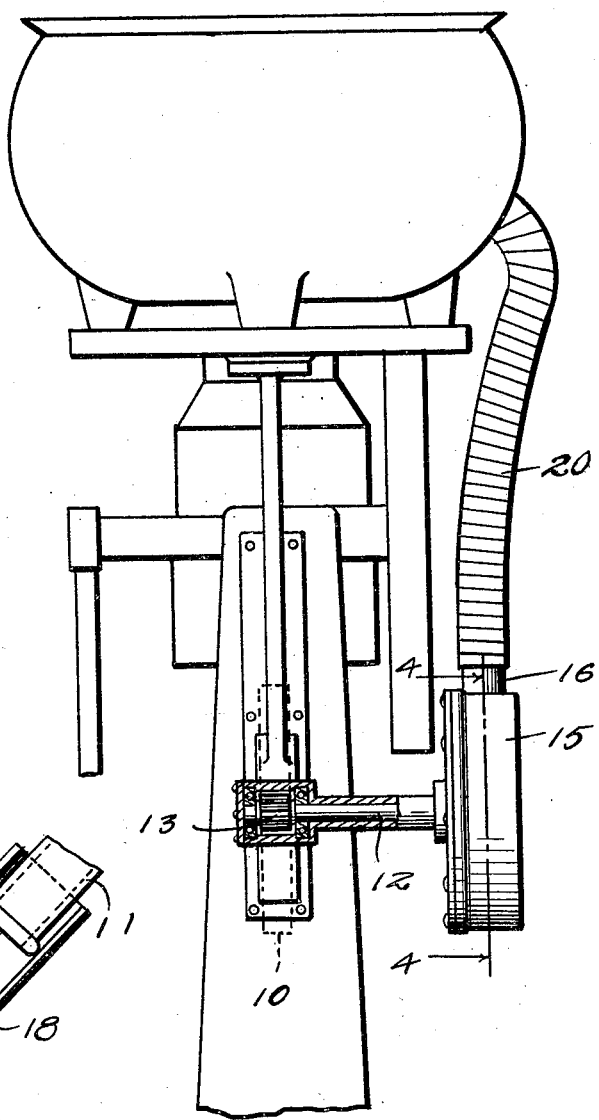
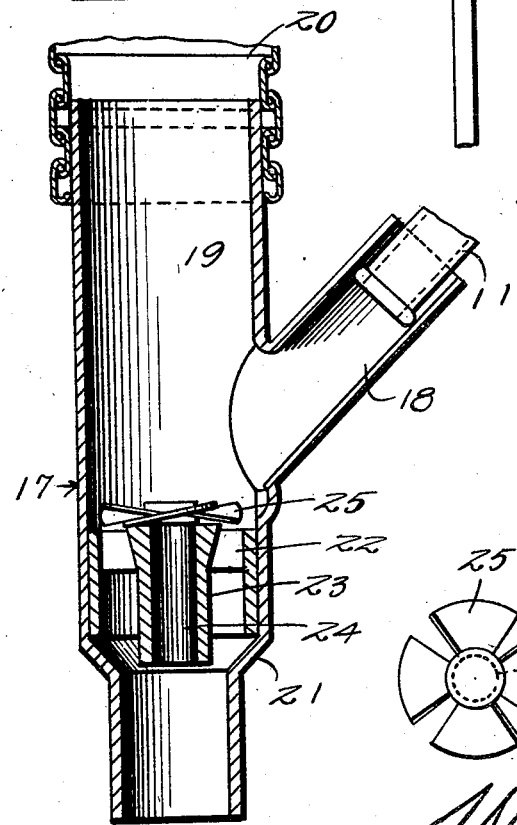
INVENTOR.
W. H. Lucan
BY
Watson E. Coleman, ATTORNEY.

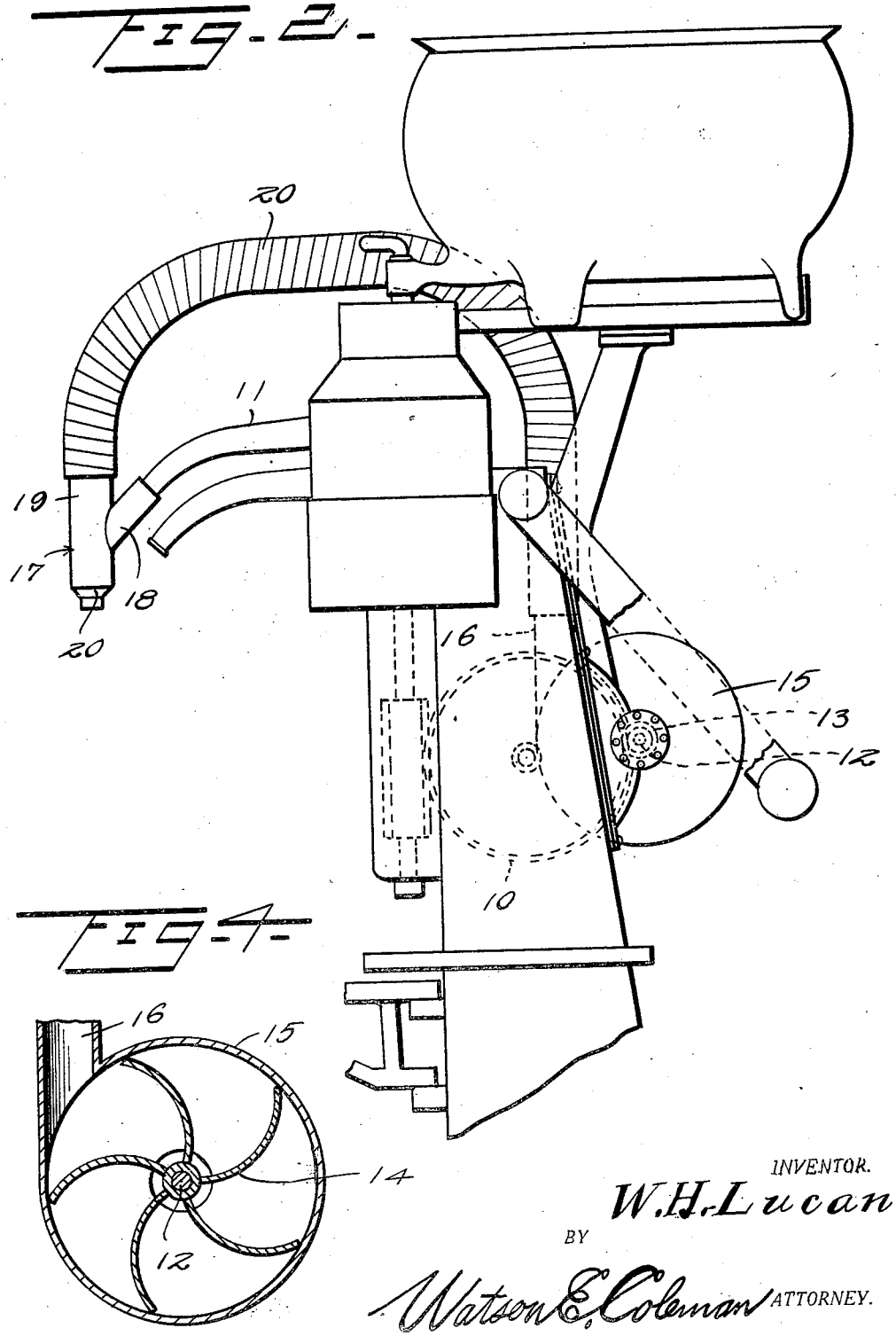

Patented Jan. 1, 1929.

1,697,729

UNITED STATES PATENT OFFICE.

WILLIAM H. LUCAN, OF PALMYRA, MISSOURI, ASSIGNOR OF ONE-HALF TO ROLLAND M. WAGNER, OF QUINCY, ILLINOIS.

CREAM AERATOR.

Application filed June 9, 1927. Serial No. 197,705.

This invention relates to a cream aerator and more particularly to a device of this character which may be produced in the form of an attachment for cream separators.

An important object of the invention is to provide a device of this character which may be readily attached to existing cream separators without altering the present construction thereof and which will cool the cream as it is delivered from the cream spout.

A further and more specific object of the invention is to provide means for mixing a blast of air with the cream as delivered from the spout of a cream separator.

A still further object of the invention is the provision of a device of this character of such construction that the means for producing the blast of air may be operated from the driving mechanism of the separator.

These and other objects I attain by the construction shown in the accompanying drawings, wherein for the purpose of illustration is shown a preferred embodiment of my invention and wherein:—

Figure 1 is a side elevation partially in section embodying a cooling attachment constructed in accordance with my invention;

Figure 2 is a view similar to that shown in Figure 1 but at right angles thereto;

Figure 3 is a detail sectional view through the fitting connecting with the cream spout;

Figure 4 is a section on the line 4—4 of Figure 1;

Figure 5 is a plan view of the agitating propeller.

Referring now more particularly to the drawings, wherein for the purpose of illustration I have shown portions of a well known type of cream separator, the numeral 10 indicates a drive gear of the separator and 11 the cream outlet spout thereof. In accordance with my invention, I provide a shaft 12, the pinion 13 meshing with the drive gear 10 and likewise secure to this shaft the impeller 14 of a centrifugal fan, the casing of which is designated at 15 and the outlet at 16.

I further provide a Y-fitting 17, one arm 18 of which is adapted for engagement with the outlet end of the cream outlet spout 11 and the other arm 19 of which is connected by a flexible conduit 20 with the outlet 16 of the impeller casing 15. The stem 20 of the Y-fitting is reduced below the point of connection of the arms 18 and 19 to form a seat 21 for a spider 22, the central portion of which provides a bearing 23 for a shaft 24 mounting a propeller 25.

It will be obvious that in the operation of the cream separator, a blast of air will be directed through the conduit 20 and arm 19 against the propeller 25, causing the same to rotate and thereby agitate cream entering through the arm 18 from the spout 11. This agitation will cause the air and cream to properly intermingle, so that a maximum cooling action of the cream can be obtained from the blast.

It will also be obvious that the construction hereinbefore set forth is capable of a certain range of change and modification without materially departing from the spirit of the invention and I accordingly do not limit myself to such specific structure except as hereinafter claimed.

I claim:—

1. Means for aerating cream or similar liquids comprising a fitting, means for delivering the liquid to the fitting, means for delivering a blast of air to the fitting, and means operated by the blast of air after its engagement with the liquid for intermingling the cream with the blast of air.

2. Means for aerating cream or other liquids comprising a Y-fitting, means for delivering the liquid to one arm of the fitting, means for delivering a blast of air to the other arm of the fitting, and means in the stem of said fitting rotated by the blast of air for intermingling the blast of air with the liquid.

3. Means for aerating cream or other liquids comprising a Y-fitting, means for delivering the liquid to one arm of the fitting, means for delivering a blast of air to the other arm of the fitting, the stem of the fitting being reduced intermediate its ends to produce a seat, a spider supported from said seat, and a propeller rotatably supported from the spider.

4. In apparatus for aerating cream or other fluid, means for directing a blast of air against a stream of the fluid and means operated by the blast of air subsequently to its engagement with the fluid intermingling the fluid therewith.

In testimony whereof I hereunto affix my signature.

WILLIAM H. LUCAN.